Aug. 16, 1932.   T. R. RHEA ET AL   1,871,469
CONTROL SYSTEM FOR MOVING OBJECTS
Filed July 12, 1929

Inventors:
Thomas R. Rhea,
James D. Tear,
Charles F. Green,
by Charles V. Tullar
His Attorney.

Patented Aug. 16, 1932

1,871,469

UNITED STATES PATENT OFFICE

THOMAS R. RHEA AND JAMES D. TEAR, OF SCHENECTADY, NEW YORK, AND CHARLES F. GREEN, OF URBANA, ILLINOIS, ASSIGNORS TO GENERAL ELECTRIC COMPANY, A CORPORATION OF NEW YORK

CONTROL SYSTEM FOR MOVING OBJECTS

Application filed July 12, 1929. Serial No. 377,824.

This invention relates to control systems for moving craft, more particularly to control systems for maintaining a moving craft on a predetermined course, and has for an object the provision of a steering control system in which a series of properly directed corrective impulses will be delivered to the rudder of the craft when the craft deviates from a predetermined course.

In illustrating this invention in one form thereof it is shown as embodied in a control system particularly adapted for automatically maintaining an airplane on a predetermined course.

In carrying this invention into effect in one form thereof means are employed for intermittently operating the rudder of the craft to impart a series of corrective impulses thereto, together with a direction sensitive device for controlling the rudder operating means.

Figure 1:
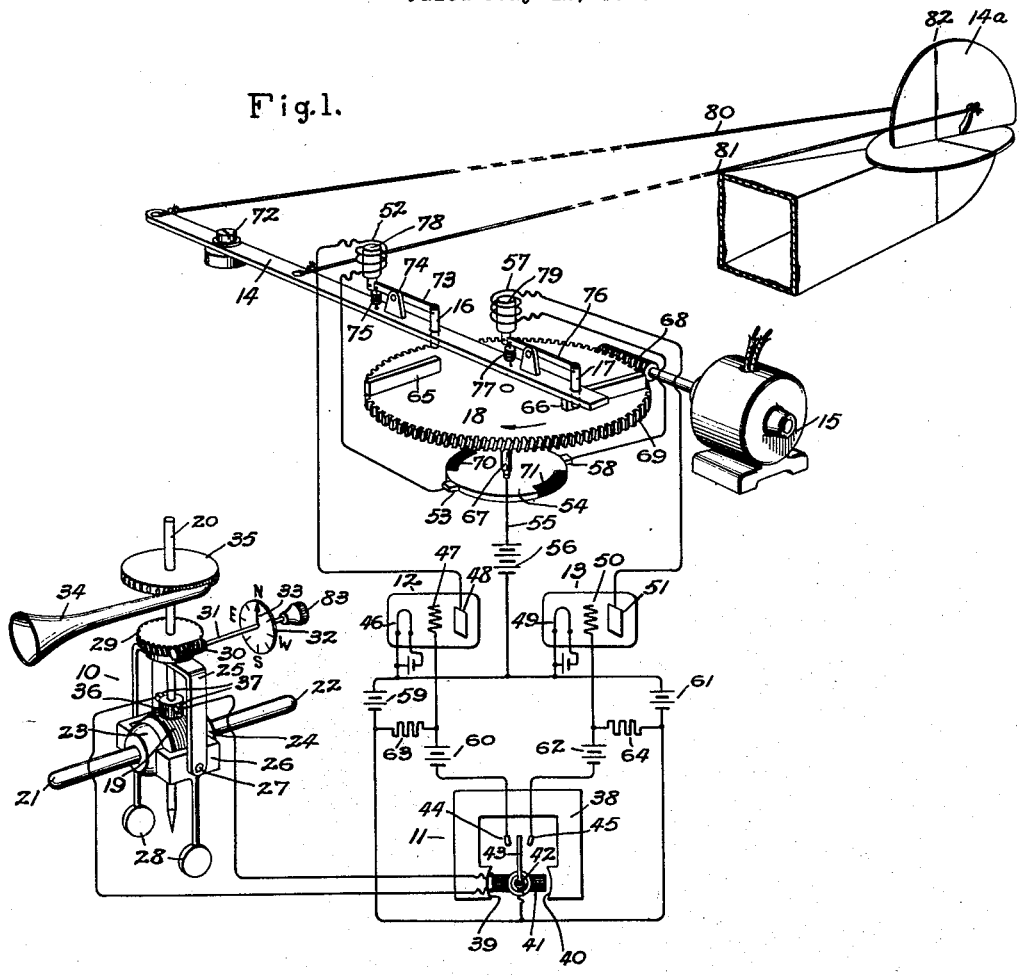
Figure 2:
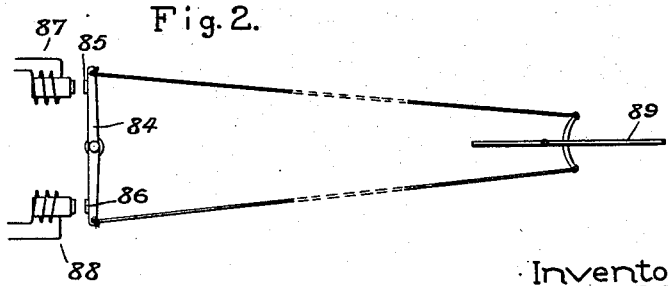

For a more thorough and complete understanding of the invention reference should now be made to the following specification and to the accompanying drawing in which Fig. 1 is a simple diagrammatic representation of the invention as embodied in a system for controlling an airplane; and Fig. 2 is a fragmentary view showing a modification thereof.

Referring now to the drawing a direction sensitive device 10 mounted in a favorable magnetic position within the airplane serves to actuate a contact making galvanometer 11 to energize one or the other of the two electric discharge devices 12 or 13 respectively, either of which in turn serves to connect the tiller bar 14, to which the rudder 14—a is connected, with a suitable intermittent driving means such as constituted by the electric motor 15, cam followers 16 and 17 and the cam carrying plate 18 driven by the electric motor 15.

Although any suitable direction sensitive device such as the conventional form of earth conductor compass might be employed we prefer to use the magneto compass shown in the drawing which is the invention of James D. Tear and described and claimed in a copending application Serial No. 320,329, filed November 19, 1928, assigned to the same assignee as the assignee of the present invention. As shown, the magneto compass 10 comprises an armature winding 19 rotatably mounted upon a shaft 20 which is journaled in suitable bearings (not shown) provided upon the frame-work of the airplane, and a pair of elongated pole pieces 21 and 22 made of a suitable ferro-magnetic material and provided with flared pole faces 23 and 24 respectively between which armature 19 is arranged to be rotated. The pole pieces 21 and 22 may be supported from the frame of the airplane by any suitable supporting means such for example as a supporting plate (not shown) and are so mounted as to be freely rotatable about a horizontal axis, but constrained to move with the airplane about a vertical axis by means of the gimbal mounting comprising the U-shaped bracket 25 rotatably mounted with respect to shaft 20 and the rectangular shaped housing 26 pivotally supported by trunnions 27 journaled in U-bracket 25. A pendulum 28 of any suitable form serves to stabilize the pole pieces 21 and 22 in a horizontal plane whilst a mechanical course setting device serves to orient the pole pieces into desired positions of azimuth. As shown this course setting device comprises a worm wheel 29 secured to U-bracket 25 and rotatably mounted with respect to shaft 20, a cooperating worm 30, worm shaft 31, compass card 32 and cooperating index arrow member 33 mounted upon worm shaft 31.

The armature 19 is rotated at a suitable speed by any suitable driving means connected with shaft 20, such for example as the wind turbine which, as shown in the drawing, comprises a nozzle member 34 which is arranged to direct a stream of air against the serrated periphery of a rotor member 35 secured to drive shaft 20. The terminals of armature windings 19 are brought out to a commutator 36 with which brushes 37 make electrical contact.

The contact making galvanometer 11 consists of a permanently magnetized frame member 38 provided with concave pole faces 39 and 40 in the air gap between which an armature winding 41 mounted upon a shaft 42 and carrying a movable contact 43, is arranged to rotate. As shown this movable contact member 43 may make contact with either of the stationary contacts 44 or 45 which are respectively connected to the input circuits of the electric discharge devices 12 and 13.

Although any suitable form of relay device could be used in this system we prefer to use vapor electric or electric discharge devices of the type marketed under the trade name Thyratron. This type of electric discharge device is similar in most respects to an ordinary three electrode vacuum tube but differs from the ordinary tube in that a small quantity of inert gas such for example as mercury vapor is introduced into the envelope after exhaust. The presence of this inert gas within the envelope serves to change the usual pure electron discharge between the cathode and anode into an arc stream. The discharge between cathode and anode may be started by suitable grid biasing means but once started the grid is no longer able to control the output current either to interrupt, to diminish or to modulate it; the instantaneous value of the output current being almost solely a function of the impedance of the external circuit.

In the drawing the electric discharge device 12 is provided with a filamentary cathode 46, a grid 47 and a plate or anode 48; the device 13 being provided with similar elements 49, 50 and 51 respectively. Each of the electric discharge devices 12, 13 is provided with an output circuit; that for device 12 consisting of a plate 48, solenoid winding 52, brush 53, interrupting plate 54, common return lead 55, biasing battery 56, and cathode 46 and the output circuit for device 13 including the plate 51, solenoid 57, brush 58, interrupting plate 54, common return lead 55, biasing battery 56 and cathode 49.

A biasing battery 56 is provided in the common return lead 55 of the output circuits of the electric discharge devices and serves to impart a positive bias to the anodes 48 and 51 which bias may be removed or interrupted by rotation of the interrupter plate 54.

Each of the electric discharge devices is provided with the usual input circuit; that for the discharge device 12 extending from cathode 46 through biasing battery 59, movable contact member 43, stationary contact 44 and positive biasing battery 60 to the grid 47 and the input circuit for device 13 extending from the cathode 49 through the biasing battery 61, movable contact member 43, stationary contact 45 and positive biasing battery 62 to the grid 50. The biasing batteries 59 and 61 serve to impart a permanent negative bias to the grids 47 and 50 through protective resistors 63 and 64 respectively which bias is of a magnitude sufficient to prevent current flow being started between the cathodes and the anodes irrespective of the magnitude of any positive bias that may be applied to the anodes. The input circuits just described are normally open circuits including the normally open stationary contact members 44 and 45 in parallel relationship with the protective resistors 63 and 64 respectively and when one or the other of these circuits is closed in by actuation of movable contact member 43 into engagement with either of the stationary contacts 44, 45 in response to energization of the armature winding 41 one or the other of the batteries 60 or 62 will then impart a positive bias to the grid of the electric discharge device with which it is connected. The positive bias so imparted will be of a magnitude sufficient to initiate current flow between cathode and anode.

The cam carrying plate 18 is provided with a suitable number of lugs or cams 65 and 66 mounted at or near the periphery of the plate. Although but two cams are illustrated in the drawing it is to be understood that one cam is sufficient and that more than two may be employed if desired. The cam carrying plate 18 is rotatably mounted upon a shaft 67 to which the interrupter plate 54 is also secured for rotation. As shown plate 18 is continuously rotated at a suitable speed by any suitable driving means such as the small direct current electric motor 15 which cooperates with the worm teeth 69 with which plate 18 is provided at its periphery.

The interrupter plate 54 is provided with two arcuate shaped insulating sections 70 and 71 respectively which serve to interrupt the output circuits of the electric discharge devices after current flow has been initiated therein and, therefore, serve to deenergize the solenoid windings 52 and 57 respectively included in the output circuits of the discharge devices. These interruptions of the output circuits will occur at a frequency which is dependent upon the speed of rotation of the motor 15 as is well understood.

The tiller bar 14 is located in an appropriate position in the fuselage of the airplane and is pivotally mounted for rotation in either direction about the axis of a shaft 72 and is also arranged in such a position as to extend normally substantially diametrically across and in operative relationship a short distance above the cam carrying plate 18. As shown the tiller bar is provided with two cam followers 16 and 17 located diametrically opposite each other with respect to the center of rotation of the plate 18.

The cam follower 16 is mounted at the extremity of a lever 73 having a fulcrum 74 mounted upon the tiller bar 14 and protrudes through an opening in the tiller bar 14 into the path of the cams 65 and 66, but is normally biased upwardly to a position free of the path of the cams by a biasing spring 75. Cam follower 17 is likewise mounted upon a lever 76 and is biased upwardly out of engagement with the cams by a biasing spring 77.

The levers 73 and 76 upon which are carried the cam followers 16 and 17 are also provided at their opposite extremities with soft iron cores or plungers 78 and 79 respectively and these serve to actuate the cam followers 16 and 17 against the bias of their biasing springs into a position in the path of the cams in response to energization of the solenoid coils 52 and 57 as will be understood by persons skilled in the art. The rudder 14—a of the airplane is connected to the tiller bar 14 by suitable cables or wires 80 and 81 and may be rotated about the axis of a shaft 82 upon which it is mounted in bearings not shown. Although the tiller bar is shown as connected to the main rudder of the airplane it is, of course, to be understood that it might be connected to a small micro-rudder provided in the tail of the airplane.

It will be observed that due to the diametrically opposite arrangement of the cam followers 16 and 17 with respect to the center of rotation of plate 18, that the tiller bar 14 and likewise rudder 14—a may be rotated in opposite directions from a central or neutral position depending upon which of the cam followers is actuated into the path of the cams 65, 66. The cams themselves are so designed and arranged that the followers ride off the cams after a predetermined movement of the tiller bar 14, which movement is preferably sufficient to cause the rudder 14—a to move through an angle of between 5° and 10° from the neutral position when the tiller bar 14 is connected with the cam plate 18 by actuation of one of the cam followers into engagement with a cam.

With the above understanding of the elements comprised in a system embodying our invention the operation of the system will be readily understood from the following description.

It will be assumed that the small electric motor 15 is connected to any suitable source of supply such for example as a generator driven by the engine of the air-craft and is rotating the cam carrying plate 18 at a suitable speed which will preferably be between 40 and 60 revolutions per minute. The pole pieces 21 and 22 of the direction sensitive device 10 may then be rotated into the desired position of azimuth by rotating the knob 83 of the mechanical course setting device until their longitudinal axis occupies an east-west (magnetic) plane when the airplane is pointed or headed on the desired course. This setting will be indicated by the index arrow 33 and the compass card 32 with which it cooperates. While occupying an east-west (magnetic) plane the longitudinal axis of the pole pieces will be transverse to, or at right angles with the horizontal component of the earth's magnetic field and as will be understood by persons skilled in the art, no flux will be induced longitudinally of the pole pieces by the earth's magnetic field. This condition will obtain as long as the airplane remains upon the chosen or predetermined course.

Should the airplane deviate from its chosen course the longitudinal axis of the pole pieces 22 will suffer a corresponding deviation from an east-west (magnetic) plane and a flux will be induced longitudinally of the pole pieces which will cross the air gap between the flared pole faces from left to right or from right to left depending upon the direction of deviation of the airplane from its course. As a result of this flux, armature 19 which is being rotated in the air gap by the rotor 35 of the wind turbine will have an electromotive force generated in its winding, the polarity of which at the brushes 36 and 37 will depend upon the direction of the deviation of the airplane from the chosen course and will cause a current to flow in the armature winding 41 of contact making galvanometer 11 as will be well understood. If it be assumed that a deviation from the course to the right will cause a current to flow in armature winding 41 in such a direction as to actuate the movable contact 43 into engagement with right hand stationary contact member 45 then clearly a deviation to the left of the course will cause the contact member 43 to be actuated into engagement with the left hand stationary contact member 44.

Assuming a deviation to the right, the contact member 43 will be actuated into engagement with contact 45 and as before explained a positive bias will be imparted to the grid 50 of the electric discharge device 13 which will be of sufficient magnitude to overcome the negative bias due to the biasing battery 61 and to initiate a current flow between the cathode 49 and the anode 51 in the output circuit. Cam follower 17 will then be actuated into a position in the path of the cams 65 and 66 in response to energization of solenoid 57 which is connected in series in the output circuit of the discharge device 13. When either of the cams 65 and 66 engages the cam follower 17, the tiller will be actuated in a clockwise direction to correct the right hand deviation of the airplane from the chosen course.

The speed of the motor 15 is preferably such as to cause the plate 18 to rotate at a speed of between 40 and 60 revolutions per minute. Thus, it will be seen that since a cam and a cam follower are only in engagement with each other for a portion of a revolution of the plate and that every time a cam follower rides off a cam face, the rudder is caused by air pressure to return to its central or neutral position that the effect of a cam coming into engagement with the cam follower at such frequent intervals serves to impart a series of non-cumulative correctively directed impluses to the rudder 14—a when the plane deviates from its chosen course. The relative duration of an impulse can be regulated by properly designing the cam whilst the frequency of these impulses may be controlled by controlling the speed of the motor 15 or by adding extra cams to the cam plate as will be understood by persons skilled in the art.

Insulating portions 70 and 71 of the interrupter plate are so positioned as to interrupt the plate or output current of the electric discharge device when a cam follower rides off the face of a cam and thus to deenergize the solenoid 52 or 57 as the case may be and permit the biasing spring 75 or 77 to withdraw its cam follower from the path of the cams.

It will, of course, be clear that had the airplane deviated from its course to the left instead of to the right as above described that the operation would in all respects be similar to that just described except that movable contact member 43 would have been actuated into engagement with left hand stationary contact 44, and cam follower 16 would have been actuated into the path of the cams as a result of establishment of current flow in the output circuit of electric discharge device 12, the result of which would be a counterclockwise rotation of the rudder 14—a to correct for the left hand deviation of the airplane from its course.

In the modification shown in Fig. 2, the cam plate, cams and cam followers have all been dispensed with and a centrally pivoted tiller bar 84 is provided at its extremities with soft iron armature members 85 and 86 in cooperating relationship with the cores of solenoids 87 and 88. The solenoids 87 and 88 are the same as the solenoid coils 52 and 57 of Fig. 1 and are similarly connected in the output circuits of electric discharge devices 12 and 13 exactly as are the solenoid coils 52 and 57 in Fig. 1. The output circuits will be interrupted by a suitable interrupter such as the interrupting plates 54 which will be driven at a suitable speed to provided the impulsing operation of the tiller bar which was obtained by the system described in Fig. 1 by the mechanical arrangement above described. Solenoids 87 and 88 will be selectively energized in the manner described above for solenoid 52 and 57 and the corrective impulses to the rudder 89 will result from the repeated attraction of either of the armatures 85 or 86 into engagement with the cores of solenoids 87 or 88 respectively as will be obvious from the drawing. The complete operation will readily be understood from the description of the operation of the system of Fig. 1.

Although in accordance with the provisions of the patent statutes we have described our invention as embodied in concrete form as represented by specific apparatus we would have it understood that the invention is not limited thereto since alterations and modifications will readily suggest themselves to skilled workers in the art without departing from the true spirit of the invention or the scope of the annexed claims.

What we claim as new and desire to secure by Letters Patent of the United States is:

1. A steering system for a moving object comprising a steering device for said object, a continuously rotating driving member, means for connecting said steering device to said member for a predetermined movement of said steering device after which said steering device is released, and means responsive to a deviation of said object from a predetermined course for controlling said connecting means.

2. A control system for aircraft and the like comprising in combination, a control surface, a pivotally mounted tiller operably connected to said control surface, a continuously rotating driving member, means for connecting said tiller to said member to impart a series of non-cumulative corrective impulses to said control surface, and a direction sensitive device operable in response to deviations from a predetermined direction for rendering said means operable.

3. In an automatic steering system the combination with a pivotally mounted rudder of a plurality of means including a continuously rotating cam member for applying a series of periodic oscillations to said rudder in opposite directions, and a direction sensitive device operable in response to deviation from a predetermined course in one direction for connecting said cam means to said rudder to apply corrective impulses to said rudder for said deviation, and operable in response to deviation from said course in the opposite direction for connecting said cam member to another of said means to apply a series of oppositely directed impulses to said rudder to correct for said deviation.

4. An automatic control system for movable craft comprising in combination a rudder mounted for rotation about an axis, a driving member, means for connecting said rudder to said driving member for a predetermined movement in one direction about said axis, means for connecting said rudder to said member for a predetermined movement in the other direction about said axis, and a direction sensitive device operable in response to deviations from a predetermined direction for selectively rendering said connecting means operable to impart a series of non-cumulative impulses to said rudder to correct for said deviations.

5. In an aircraft control system, the combination with a control surface, of an electric discharge device provided with an output circuit, means operable in response to energization of said output circuit for applying a series of non-cumulative corrective impulses to said control surface, and means for controlling the energization of said output circuit.

6. Apparatus for automatically controlling aircraft and the like comprising in combination a control surface, a plurality of electric discharge devices each provided with an input circuit and with an output circuit, means operable in response to energization of said output circuits for operating said control surface in a series of corrective impulses of predetermined magnitude and for releasing said control surfaces after each impulse, and a direction sensitive device operable in response to deviations from a predetermined direction for selectively establishing said input circuits to energize said output circuits.

7. An automatic steering control system for movable craft comprising in combination a rudder mounted for rotation about an axis, a plurality of electric discharge devices, each provided with an input circuit and with an output circuit, a driving member, means for continuously rotating said member, means responsive to energization of one of said output circuits for connecting said rudder to said member for rotation in one direction, means operable in response to energization of the other of said output circuits for connecting said rudder to said member for rotation in the opposite direction, and a direction sensitive device operable in response to deviation from a predetermined course in one direction for completing one of said input circuits to energize one of said output circuits, and operable in response to deviation from said course in the opposite direction for completing the other of said input circuits to energize the other of said output circuits.

8. An automatic steering system for movable craft, and the like comprising in combination a rudder, a continuously rotating driving member, means for connecting said rudder to said driving member for a predetermined movement in one direction after which said rudder is released, a second means for connecting said rudder to said driving member for a predetermined movement in the opposite direction after which said rudder is released, and means responsive to deviation from a given course in one direction for intermittently operating one of said rudder operating means to correct for said deviation, and responsive to deviation from said course in the opposite direction for intermittently operating said second rudder operating means to correct for said deviation in the opposite direction.

9. In a steering control system, a pivotally mounted rudder, a pair of electric discharge devices each provided with an input circuit and with an output circuit, a driving member means responsive to energization of said output circuits for connecting said rudder to said driving member for predetermined oppositely directed rotations of said rudder after which said rudder is released, a contact making galvanometer operable in response to the direction of current flow in its armature for selectively completing said input circuits for selectively energizing said output circuits, and a direction sensitive magneto electric device having its armature connected to the armature of said galvanometer and operable in response to deviations from a predetermined course in opposite directions for generating electromotive forces of opposite polarity.

10. In an aircraft control system, the combination with a rudder mounted for rotation about an axis, a continuously rotating driving means, a pair of means for connecting said rudder with said driving means for predetermined oppositely directed rotations about said axis after which said rudder is released, and a direction sensitive device operable in response to deviation in one direction from a predetermined course for rendering one of said connecting means operable, and operable in response to deviation in the reverse direction from said course for rendering the other of said connecting means operable.

11. An automatic piloting control system comprising in combination a rudder mounted for rotation about an axis, a driving means for operating said rudder intermittently, a pair of electric discharge devices each provided with an input circuit and with an output circuit, means operable in response to energization of one of said output circuits for connecting said rudder with said driving means to impart a series of corrective impulses to said rudder in one direction, a second means operable in response to energization of the other of said output circuits for connecting said rudder with said driving means to impart a series of oppositely directed corrective impulses to said rudder and means for selectively completing said input circuits to selectively energize said output circuits.

12. In an automatic steering system for moving craft and the like a pivotally mounted rudder, a continuously rotating driving means, means for intermittently engaging said rudder with said driving means so as to impart a series of rotative impulses of predetermined magnitude to said rudder after each of which said rudder is released, a second means for intermittently engaging said rudder with said driving means for imparting a series of oppositely directed rotative impulses of a predetermined magnitude to said rudder, and a direction sensitive device operable in response to deviations in one direction from a predetermined course for rendering the first of said engaging means operable, and operable in response to deviations in the opposite direction for rendering the second of said engaging means operable.

13. Steering apparatus for aircraft and the like comprising in combination a rudder mounted for rotation about an axis, a pair of electric discharge devices each provided with an input circuit and with an output circuit including an electro responsive device, mechanical connections between said electroresponsive devices and said rudder including a continuously rotating member arranged to effect operation of said rudder in a series of non-cumulative impulses in opposite directions about said axis, and a direction sensitive device responsive to deviations from a predetermined direction for selectively completing said input circuits for selectively establishing said output circuits to correct for said deviation.

14. In a control system, a rotatably mounted control surface, a pair of electric discharge devices each provided with an input circuit and with an output circuit, a driving means, an electroresponsive means operable in response to energization of one of said output circuits for effecting intermittent driving connections between said control surface and said driving means for imparting a series of corrective impulses to said control surface, a second electroresponsive means operable in response to energization of the other output circuit for effecting intermittent driving connections between said control surface and said driving means for imparting a series of oppositely directed corrective impulses to said control surface, and means for selectively establishing said input circuits to energize selectively said output circuits.

15. In an automatic control system for aircraft and the like, a rotatably mounted rudder, a rotatably mounted disc provided with a cam, means for rotating said disc, means for connecting said rudder with said cam so as to impart a series of non-cumulative corrective impulses to said rudder, and means for controlling said connecting means.

16. In combination in an automatic control system for aircraft and the like, a rotatably mounted rudder, a rotatably mounted disc provided with a cam and means for rotating said disc, means for connecting said rudder with said cam to impart a series of non-cumulative corrective impulses to said rudder, a second means for connecting said rudder with said cam to impart a series of oppositely directed non-cumulative corrective impulses to said rudder, and a direction sensitive device operable in response to deviations from a predetermined course in one direction for rendering one of said connecting means operable and operable in response to deviations from said course in the opposite direction for rendering the other of said connecting means operable.

17. In an automatic steering system for moving craft, a pivotally mounted rudder, a tiller mounted for rotation about an axis and connected to said rudder, a rotatably mounted disc provided with a cam and means for rotating said disc, a pair of electric discharge devices each provided with an input circuit and with an output circuit, means responsive to energization of one of said output circuits for engaging said tiller with said cam to impart a series of corrective impulses to said rudder, a second means responsive to energization of the second of said output circuits for imparting a series of oppositely directed corrective impulses to said rudder, and a direction sensitive device operable in response to deviations from a predetermined course in one direction for completing one of said input circuits to energize one of said output circuits, and operable in response to deviations from said course in the opposite direction to energize the other of said output circuits.

In witness whereof, we have hereunto set our hands, this 11th day of July, 1929.

THOMAS R. RHEA.
JAMES D. TEAR.
CHARLES F. GREEN.